United States Patent
Ikoma

(10) Patent No.: US 7,549,361 B2
(45) Date of Patent: Jun. 23, 2009

(54) VIBRATION DAMPING APPARATUS FOR RECIPROCATING DRIVE AND CUTTING HEAD

(75) Inventor: Kenji Ikoma, Wakayama (JP)

(73) Assignee: Shima Seiki Manufacturing Limited, Wakayama (JP)

( * ) Notice: Subject to any disclaimer, the term of this patent is extended or adjusted under 35 U.S.C. 154(b) by 491 days.

(21) Appl. No.: 10/539,829

(22) PCT Filed: Dec. 3, 2003

(86) PCT No.: PCT/JP03/15453

§ 371 (c)(1),
(2), (4) Date: Jun. 20, 2005

(87) PCT Pub. No.: WO2004/057213

PCT Pub. Date: Jul. 8, 2004

(65) Prior Publication Data

US 2006/0168821 A1     Aug. 3, 2006

(30) Foreign Application Priority Data

Dec. 20, 2002   (JP)   ............................. 2002-370907

(51) Int. Cl.
*B26D 5/08* (2006.01)
*F16F 15/24* (2006.01)

(52) U.S. Cl. ............... 83/615; 83/628; 83/629; 30/208; 74/37; 74/44; 493/444

(58) Field of Classification Search ............ 83/615, 83/528, 628, 623, 630, 629; 30/208, 216, 30/209, 95–97, 124, 131–135, 223, 194, 30/196, 223.5, 210, 273, 275; 74/37, 44, 74/397, 25, 38, 423, 40, 52, 603; 417/415; 493/444, 437, 476

See application file for complete search history.

(56) References Cited

U.S. PATENT DOCUMENTS

| | | | | | |
|---|---|---|---|---|---|
| 2,535,491 | A | * | 12/1950 | Felton | 30/374 |
| 2,706,637 | A | * | 4/1955 | Cain | 369/15 |
| 2,949,944 | A | * | 8/1960 | Blachly | 30/394 |
| 2,962,910 | A | * | 12/1960 | Wolfram | 474/13 |

(Continued)

FOREIGN PATENT DOCUMENTS

JP    58-166159 A    10/1983

(Continued)

*Primary Examiner*—Ghassem Alie
(74) *Attorney, Agent, or Firm*—Harness Dickey & Pierce

(57) ABSTRACT

A vibration damping device is described that dampens vibration produced during the conversion of rotational motion into reciprocal motion. The damping is performed using a simple structure wherein first and second conversion mechanisms are symmetrically arranged with respect to a plane of symmetry, first and second rotating shafts rotate opposite to each other at a constant speed, and the rotational motion is converted into reciprocal motion. The total of mass acting on gravity centers of a first balancer and a second balancer is approximately equal to the total of mass reciprocally driven by a first driving shaft and a second driving shaft. Both gravity centers are positioned 180 degrees to the first driving shaft and second driving shaft across the axes of the first rotating shaft and second rotating shaft. As a consequence, the forces in the direction of an axis can be balanced suppressing vibration.

15 Claims, 11 Drawing Sheets

U.S. PATENT DOCUMENTS

| | | | | | |
|---|---|---|---|---|---|
| 4,879,935 | A | * | 11/1989 | Gerber | 83/748 |
| 4,924,727 | A | | 5/1990 | Pearl et al. | |
| 5,095,793 | A | | 3/1992 | Button | |
| 5,282,397 | A | * | 2/1994 | Harkness et al. | 74/603 |
| 5,458,557 | A | * | 10/1995 | Bladie et al. | 493/444 |
| 6,067,886 | A | * | 5/2000 | Irwin | 83/615 |
| 6,334,423 | B1 | | 1/2002 | Mashimo | |

FOREIGN PATENT DOCUMENTS

| | | |
|---|---|---|
| JP | 6-154459 A | 6/1994 |
| JP | 6-53358 B2 | 7/1994 |
| JP | 7-279 B2 | 1/1995 |
| JP | 7-124361 A | 5/1995 |
| JP | 9-280067 A | 10/1997 |
| JP | 10-220547 A | 8/1998 |

* cited by examiner (a)

(b)

(c)

(d)

VIBRATION DAMPING APPARATUS FOR RECIPROCATING DRIVE AND CUTTING HEAD

TECHNICAL FIELD

The present invention relates to a vibration damping apparatus for reciprocating drive for damping vibration occurring upon conversion of rotary motion into fast reciprocal motion in order to reciprocally drive a cutting blade of a cutter or so, and cutting head.

BACKGROUND ART

Conventionally, conversion mechanisms such as crank mechanisms are broadly used for conversion between rotary motion and linear reciprocal motion. Even though reciprocal motion can be directly caused, driving in one direction and then driving in the reverse direction requires a stoppage in the course thereof, making it difficult to increase the speed. By converting a continuous rotary motion caused by a motor, etc. into a reciprocal motion, it is possible to easily obtain a fast reciprocal motion.

FIG. 11 shows a schematic structure of a cutter 1 requiring a fast reciprocal motion converted from a rotary motion for cutting. In the cutter 1, a cutting blade 6 is reciprocally moved at high speed at the cutting head 5 provided on a guide bridge 4, to clip a cut-part 8 out of a to-be-cut-sheet 7 on a holding surface 3 above a cutting table 2. Within the cutting head 5, rotary motion is converted into reciprocal motion. The holding surface 3 in general is rectangular in form. The guide bridge 4 has a form extending in a direction parallel with the shorter side of the cutting table 2, which is movable in both directions along the guides provided on the side edges on the longer sides. The cutting head 5 is movable in both directions along an extending direction of the guide bridge 4. The cutting blade 6 protrudes toward the holding surface 4 from the cutting head 5. The cutting blade 6 is reciprocally driven in a direction perpendicular to the holding surface 3 in a state to pierce through the to-be-cut-sheet 7 held on the holding surface 3, thus being allowed to reciprocally move at high speed and angularly displace about an axis parallel with the reciprocal direction.

The holding surface 3 of the cutter 1 is in a state planted with bristles of a material comparatively high in hardness, e.g. synthetic resin. Even in case the cutting blade 6 is inserted piercingly, the bristles deform in a manner avoiding the cutting blade 6 thereby being prevented from being cut. The guide bridge 4 and cutting head 5 clips a cut-part 8 out of the to-be-cut-sheet 7 according to the cutting data inputted to the cutter 1. For such a cutter 1, there is a need to increase the moving speed of the guide bridge 4 and cutting head 5 and further the reciprocation speed of the cutting blade 6 in order to improve the efficiency of cutting. In order to increase the moving speed, the cutting head 5 is necessarily reduced in size and weight. For increasing the reciprocal speed of the cutting blade 6, there is a need to increase the rotational speed on a drive source of within the cutting head 5. However, when converting a rotary motion into a reciprocal motion within the cutting head 5, vibration readily occurs due to the components, etc. of a motion caused resulting therefrom. Particularly, when reciprocal motion becomes high in speed, vibration increases.

When vibration is encountered in the occurrence of a reciprocal motion in the cutter, there is a fear of increasing the error in a contour cutting a cut-part 8 or causing a fatigue in various regions including the cutting blade 6 to be readily broken. In the crank mechanism, because rotary motion is converted into reciprocal motion while coupling the crank rod at its one end in a position eccentric from the rotary shaft and regulating the other end of the crank rod in a direction of reciprocal motion, offset load is applied to the rotary shaft. In case applying a load balanced with the load applied to the rotary shaft by the crank rod to the side opposite to the coupling to the crank rod sandwiching the rotary shaft, the reacting force driving the crank rod can be canceled to damp vibration (see JP-B-6-53358 and JP-B-7-279, for example). JP-B-6-53358 discloses a mechanism that a crank rod of a link mechanism for a counter weight compensating for a load on the crank mechanism is coupled to axial both sides of a crank mechanism for reciprocally moving the cutting blade, to reduce vibration by means of a counter weight provided on the opposite side to the crank mechanism, i.e. opposite by 180 degrees. JP-B-7-279 discloses a mechanism that a pair of rotary shafts having balance weights are arranged parallel with a crankshaft of a crank mechanism for reciprocally moving the cutting blade so that the balance weight is given a weight of a half load, to rotate the both balance weights reverse to the crank mechanism thereby reducing vibration.

The mechanism for converting rotary motion into reciprocal motion is used on the sewing machine. As to sewing machines, there are disclosures of vibration reducing mechanisms (see JP-A-6-154459 and JP-A-7-124361). In JP-A-6-154459, a pair of balancer shafts are arranged above a crankshaft of a needle crank mechanism for reciprocally driving the needle of a sewing machine, to rotate forward and reverse eccentric balancers at equal speed and reverse in direction to each other thereby reducing vibration. In JP-A-7-124361, a pair of balancer shafts are arranged on both sides sandwiching a needle crankshaft of a sewing machine, to provide the needle crank itself with an eccentric center of gravity to have a balance with a load wherein further the balancer shafts in one pair are provided with balancers and rotated reverse to the needle crankshaft thereby reducing vibration.

In case using a balancer that is a counter weight having a center of gravity in a position eccentric relative to the rotary shaft, compensation is possible for a static load. However, on the mechanism for converting rotary motion into reciprocal motion, e.g. a crank mechanism, load varies dynamically even at a constant rotational speed. Accordingly, in case attempted to cancel a load encountered upon converting rotary motion into reciprocal motion by providing a balancer on the rotary shaft, it cannot be canceled perfectly. In JP-A-6-154459, the needle is moved vertically through one crankshaft. Because a vibration damping apparatus mechanism does not operate symmetrically left and right about the axis of the needle, balance cannot be obtained perfectly in the horizontal direction. Even in case the crankshaft balancer and the rotary shaft balancer are rotated reverse by providing rotary shafts rotating reverse to the crank shaft on both sides sandwiching the crankshaft as in JP-B-7-279 or JP-A-7-124361, the balancer shafts must be arranged on both sides by being juxtaposed with the crankshaft. This increases the width of the cutting head, etc. thus making size reduction difficult.

In case providing such a link mechanism as to compensate for a load based on the crank mechanism on the side opposite, sandwiching the crankshaft, to the direction that reciprocal motion is caused by the crank mechanism as in JP-B-6-53358, a cutting head that protrudes a cutting blade downward requires a space for a link mechanism in the above thereof thus resulting in an increased height of the cutting head. Meanwhile, because the cranks are opposed at 180 degrees, in case the link mechanism is coupled to one lateral direction of a crank axis, a couple of forces occur at axial front and rear of the crank.

DISCLOSURE OF INVENTION

It is an object of the present invention to provide a vibration damping apparatus for reciprocating drive and cutting head capable of damping the vibration resulting from a reciprocal motion by attaining a balance by means of a simple structure, which can be easily reduced in size.

The invention is a vibration damping apparatus for reciprocating drive, for damping vibration occurring upon conversion of rotary motion into reciprocal motion, comprising:

a first conversion mechanism for converting a rotary motion of a first rotary shaft so that a reciprocal motion in a predetermined drive direction perpendicular to the first rotary shaft is included in a drive position provided eccentrically from the first rotary shaft;

a second conversion mechanism provided in pair with the first conversion mechanism and arranged symmetric with the first conversion mechanism with respect to a reference virtual plane parallel with the predetermined drive direction, for converting a rotary motion of a secondary rotary shaft which rotates at equal speed reverse to and is parallel with the first rotating shaft so that a reciprocal motion in the drive direction is included in a drive position provided eccentrically from the second rotary shaft, synchronously with a reciprocal motion converted by the first conversion mechanism;

a combining mechanism for extracting and combining together reciprocal motions in the drive direction converted from rotary motions by the first conversion mechanism and the second conversion mechanism, respectively;

a first counter weight having a center of gravity in a position on a side symmetric with the drive position with respect to the first rotary shaft, for taking a balance with an offset load occurring upon motion conversion; and a second counter weight provided in pair with the first counter weight and having a center of gravity in a position on a side symmetric with the drive position with respect to the second rotary shaft, for taking a balance with an offset load occurring upon motion conversion.

Furthermore, the invention is characterized by further comprising a third counter weight provided on a third rotary shaft parallel with the first rotary shaft and rotating reverse at a rotational speed twice a rotational speed of the first rotary shaft, the third counter weight being lighter in weight than the first counter weight and eccentric in center-of-gravity position with respect to the third rotary shaft; and a fourth counter weight provided in pair with the third counter weight and arranged symmetric with the third counter weight with respect to the reference virtual plane, the fourth counter weight being provided on a fourth rotary shaft parallel with the second rotary shaft and rotating reverse at a rotational speed twice a rotational speed of the second rotational shaft, the fourth counter weight being lighter in weight than the second counter weight and eccentric in center-of-gravity position with respect to the fourth rotary shaft.

Furthermore, the invention is characterized in that the combining mechanism carries out the combining so that the drive direction is on the reference virtual plane.

Furthermore, the invention is characterized in that the first conversion mechanism and the second conversion mechanism are crank mechanisms each provided with a crank rod, respectively, having one end pivotably and displaceably coupled to the drive position;

the combining mechanism including coupling members pivotably and displaceably coupled to other ends of crank rods of the first conversion mechanism and second conversion mechanism, respectively, and a guide mechanism for guiding a reciprocal motion combined by the coupling member, in the drive direction.

Furthermore, the invention is characterized in that center-of-gravity positions of the first and second counter weights and the drive direction are on a virtual plane perpendicular to the reference virtual plane.

Furthermore, the invention is characterized by comprising:

a rotation drive source for deriving a rotation output from a driving pulley;

a first driven pulley provided on the first rotary shaft;

a second driven pulley provided on the second rotary shaft so as to be paired with the first driven pulley;

an idle pulley provided so as to freely rotate; and a belt stretched over the driving pulley, the first driven pulley, the second driven pulley and the idle pulley, for conveying a rotation drive force from the driving pulley to the first driven pulley and the second driven pulley so that rotational directions of the rotation drive force become different between the first driven pulley and the second driven pulley.

Furthermore, the invention is a cutting head comprising a vibration damping apparatus for reciprocating drive according to any one of the above ones, the cutting head reciprocally driving a cutting blade on a reciprocal motion combined by the combining mechanism.

BRIEF DESCRIPTION OF DRAWINGS

Other and further objects, features, and advantages of the invention will be more explicit from the following detailed description taken with reference to the drawings wherein.

BEST MODE FOR CARRYING OUT THE INVENTION

Figure 1:
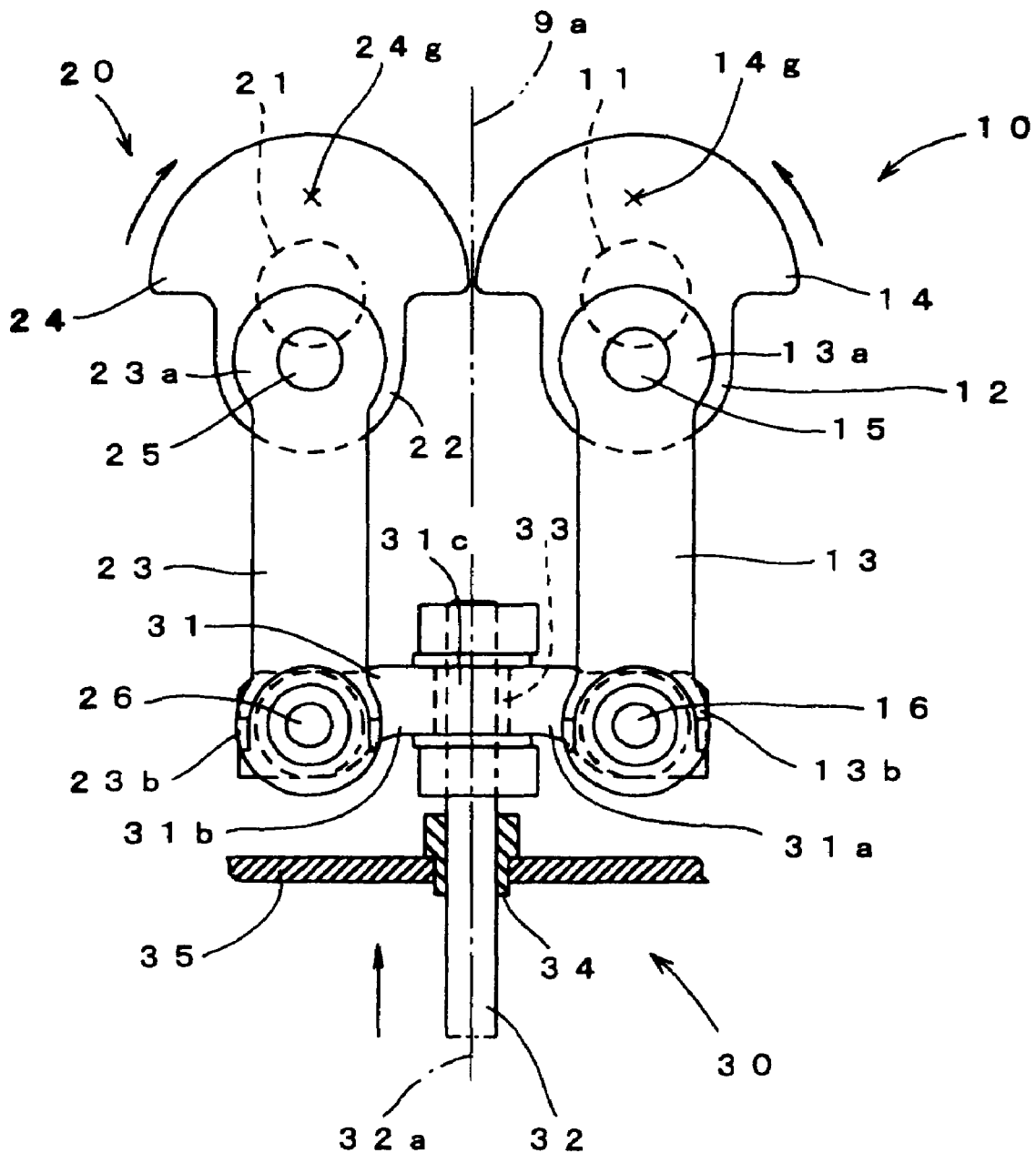
FIG. 1 is a schematic front view showing a simplified constitution of a vibration damping apparatus for reciprocating drive 9 according to one embodiment of the invention.

Now referring to the drawings, preferred embodiments of the invention are described below.

FIG. 1 shows a schematic constitution of a vibration damping apparatus for reciprocating drive 9 according to one embodiment of the invention. The vibration damping apparatus for reciprocating drive 9 is a damping apparatus as to the vibration occurring upon conversion of rotary motion into reciprocal motion in order to reciprocally drive a cutting blade by a cutting head of a cutter, including a first conversion mechanism 10, a second conversion mechanism 20 and a combining mechanism 30. The vibration damping apparatus for reciprocating drive 9 in this embodiment is constructed symmetric with respect to a virtual plane 9a. Namely, the first conversion mechanism 10 and the second conversion mechanism 20 are in a mirror relationship with each other with respect to the virtual plane 9a. The combining mechanism 30 is to extract and combine together on-virtual-plane 9a components out of the components of reciprocal motion converted from rotary motions by the first conversion mechanism 10 and the second conversion mechanism 20, respectively.

The first conversion mechanism 10 delivers a rotary motion of a first rotary shaft 11 from a first eccentric cam 12 fixed at one end of the first rotary shaft 11 to a first crank rod 13, and converts it into a reciprocal motion of the first crank rod 13. By coupling the first crank rod 13 to the first rotary shaft 11, an offset load is applied to the first rotary shaft 11. The offset load is compensated for by a first balancer 14 integrally added as a first counter weight to the first eccentric cam 12. The first crank rod 13 has, at one end, a drive end 13a pivotably and displaceably coupled to the first eccentric cam 12 by the first drive shaft 15 provided on the first eccentric cam 12. The first crank rod 13 has, at the other end, a coupling end 13b pivotably and displaceably coupled to the first coupling shaft 16.

The second conversion mechanism 20 includes a second rotary shaft 21, a second eccentric cam 22, a second crank rod 23, a second balancer 24, a second drive shaft 25 and a second coupling shaft 26, respectively. The second rotary shaft 21, the second eccentric cam 22, the second crank rod 23, the second balancer 24, the second drive shaft 25 and the second coupling shaft 26 are equivalent, respectively, to the first rotary shaft 11, the first eccentric cam 12, the first crank rod 13, the first balancer 14, the first drive shaft 15 and the first coupling shaft 16 of the first conversion mechanism 10. However, the second rotary shaft 21 is to rotate equal in speed but reverse in direction to the first rotary shaft 11.

The combining mechanism 30 includes a coupling block 31, a knife drive shaft 32, a rotary bearing 33 and a guide mechanism 34. The coupling block 31 has a first arm 31a extending toward the first conversion mechanism 10 and coupled to the first coupling shaft 16, a second arm 31b extending toward the second conversion mechanism 20 and coupled to the second coupling shaft 26, and a central portion 31c. The central portion 31c holds a rotary bearing 33 for supporting the knife drive shaft 32 in a manner for rotation about an axis 32a. The axis 32a of the knife drive shaft 32 lies on the virtual plane 9a. The reciprocal motions, respectively converted from rotary motions by the first conversion mechanism 10 and the second conversion mechanism 20, are delivered to the coupling block 31 through the first crank rod 13 and the second crank rod 23. Because of the symmetry with respect to the virtual plane 9a, the components in the axial direction 32a only are extracted and combined together.

Based on the extracted/combined components in the direction of axis 32a, the knife drive shaft 32 is reciprocally driven. A guide mechanism 34 is provided in order to guide the reciprocal motion of the knife drive shaft 32 in the direction of axis 32a. The guide mechanism 34 allows the knife drive shaft 32 to slidably displace in the direction of axis 32a and angularly displace about the axis 32a.

Figure 11:
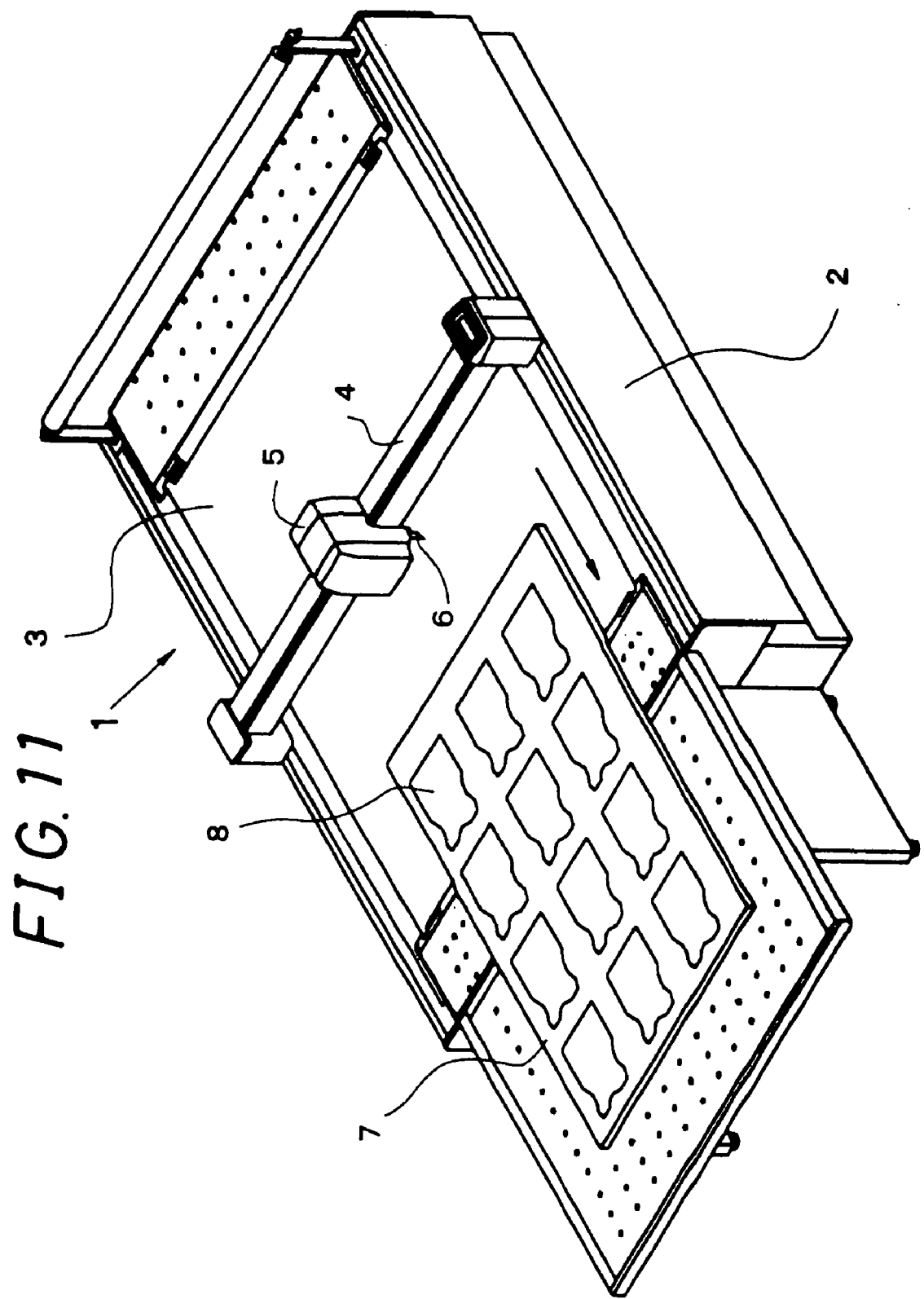
FIG. 11 is a perspective view showing a schematic outer structure of a conventional cutter.

However, where the vibration damping apparatus for reciprocating drive 9 is not used on a cutting head 5 as shown in FIG. 11 not requiring to rotate a cutting blade about an axis or is used on a sewing machine, there is no need to provide a rotary bearing 33. Meanwhile, the guide mechanism 34 satisfactorily allows only for slidable displacement in the axial direction.

As explained above, the first conversion mechanism 10 is coupled to the first crank rod 13 through the first drive shaft 15 in a drive position provided eccentric from the first rotary shaft 11, to effect a conversion in a manner including a reciprocal motion in a direction parallel with the axis 32a as a predetermined drive direction perpendicular to the first rotary shaft 11. The second conversion mechanism 20 is provided in pair with the first conversion mechanism 10 and arranged symmetric with the first conversion mechanism 10 with respect to the reference virtual plane 9a parallel with the direction of axis 32a. This converts the rotary motion of the second rotary shaft 20, parallel with the first rotary shaft 11 and rotating reverse at equal speed thereto, in a manner including a reciprocal motion in a direction parallel with the axis 32a synchronously with the reciprocal motion converted by the first conversion mechanism 10, through the second drive shaft 25 in a drive position provided eccentric from the second rotary shaft 21. The combining mechanism 30 extracts and combines together the reciprocal motions in the direction of axis 32a respectively converted from rotary motions, by the first conversion mechanism 10 and the second conversion mechanism 20. The first conversion mechanism 10 and the second conversion mechanism 20 are allowed to take a balance of the force perpendicular to the virtual plane 9a because of a conversion into reciprocal motions through rotations mutually symmetric with respect to the virtual plane 9a.

Incidentally, the first balancer 14 integrally added on the first eccentric cam 12 has a center of gravity 14g in a position on a side symmetric with respect to the first rotary shaft 11 with a drive position the drive end 13a of the first crank rod 13 is to be driven by the first drive shaft 15 provided on the first eccentric cam 12, thus functioning as a first counter weight to take a balance with an offset load occurring upon conversion of motion. The second balancer 24 integrally added to the second eccentric cam 22 is provided in pair with the first balancer 14, having a center of gravity 24g positioning on a side symmetric with a drive position where the drive end 23a of the second crank rod 23 is to be driven by the second drive shaft 25 provided on the second eccentric cam 22 as to the second rotary shaft 21, thus functioning as a second counter weight to take a balance with an offset load occurring upon conversion of motion.

The total mass of the first balancer 14 and second balancer 24 is given nearly equal to the total mass of the members, etc. existing on a delivery path of a drive force for reciprocally driving a subject of drive such as a cutting blade through the first eccentric cam 12 and second eccentric cam 22, e.g. the first crank rod 13 and second crank rod 23, the first drive shaft 15 and second drive shaft 25, the first coupling shaft 16 and second coupling shaft 26, the coupling block 31, the knife drive shaft 32, the rotary bearing 33 and the cutting blade.

Because of 180-degree opposite positioning of the center of gravity 14g, 24g as a center of mass of the first balancer 14 and second balancer 24 and the first drive shaft 15 and second drive shaft 25 as a coupling of the first eccentric cam 12 and second eccentric cam 22 to the drive end 13a, 23a of the first crank rod 13 and second crank rod 23 by sandwiching the axis of the first rotary shaft 11 and second rotary shaft 21, force balance can be taken in a drive direction when causing a reciprocal motion. This makes it possible to reduce the offset load occurring during rotation of the first rotary shaft 11 and second rotary shaft 21, thus suppressing against the occurrence of vibration.

Figure 2:
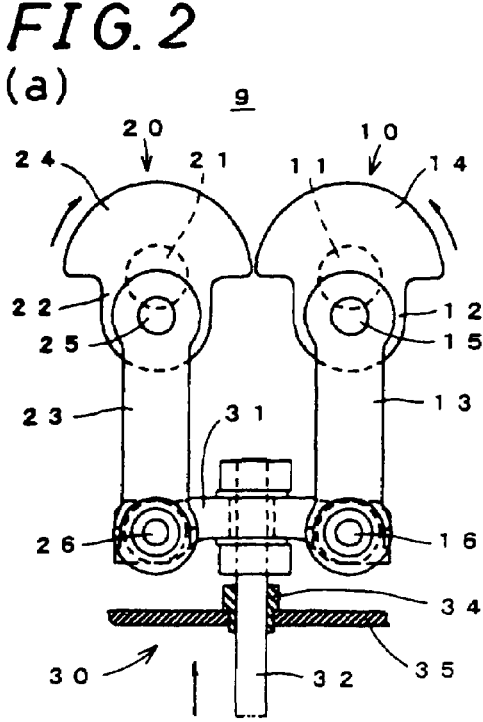
FIG. 2 is a simplified front view showing an operation state of the vibration damping apparatus for reciprocating drive 9 of FIG. 1.
Figure 2:
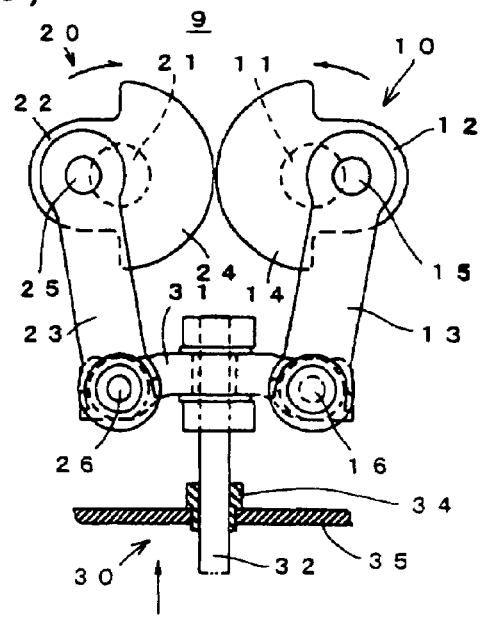
Figure 2:
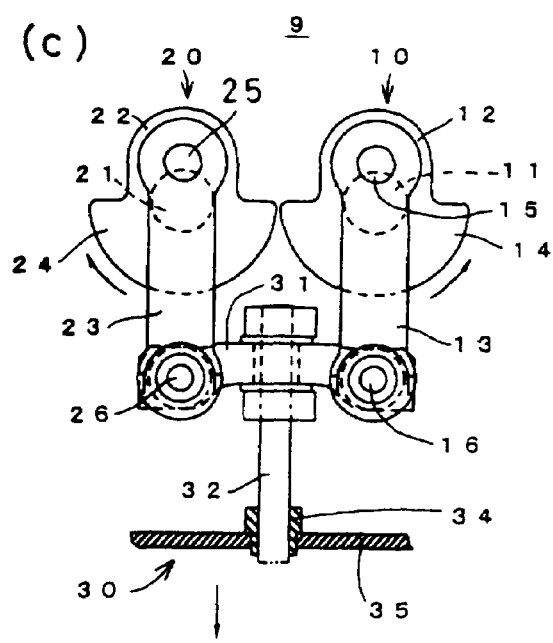
Figure 2:
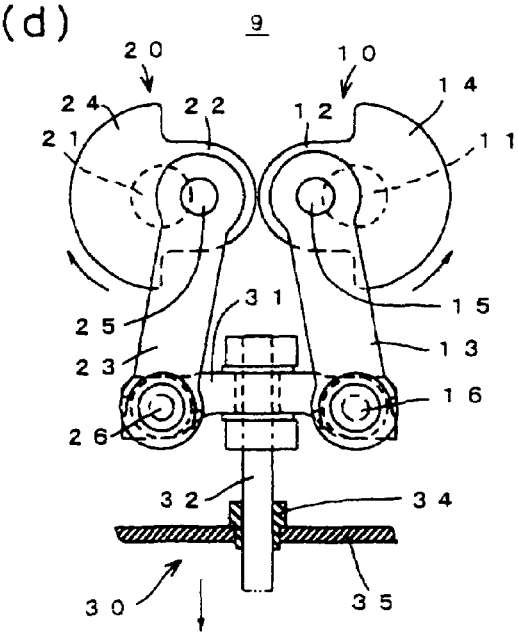

FIG. 2 shows an operation state of the vibration damping apparatus for reciprocating drive 9 of FIG. 1. (a), (b), (c) and (d) respectively show states that the first rotary shaft 11 and second rotary shaft 21 change the angle of rotation at an interval of 90 degrees. Of those, (a) and (c) correspond to the states that the first drive shaft 15 and second drive shaft 25 are in positions of bottom and top dead centers, respectively. The first rotary shaft 11 and the second rotary shaft 21 has a spacing to be taken narrow in a range that the first eccentric cam 12 and the second eccentric cam 22 are not in contact on the side close to the first balancer 14 and second balancer 24 as shown in (a)-(c) and on the side close to the first drive shaft 15 and second drive shaft 25 as shown in (d). The space caused between the first conversion mechanism 10 and the second conversion mechanism 20 can be utilized as an accommodation space for raising the coupling block 31 or the knife drive shaft 32, as shown in (c). Accordingly, with a casing 35 showing only the portion supporting the guide mechanism 34 in the figure, the cutting head, etc. can be easily reduced in size by reducing the volume to accommodate the vibration damping apparatus for reciprocating drive 9.

Figure 3:
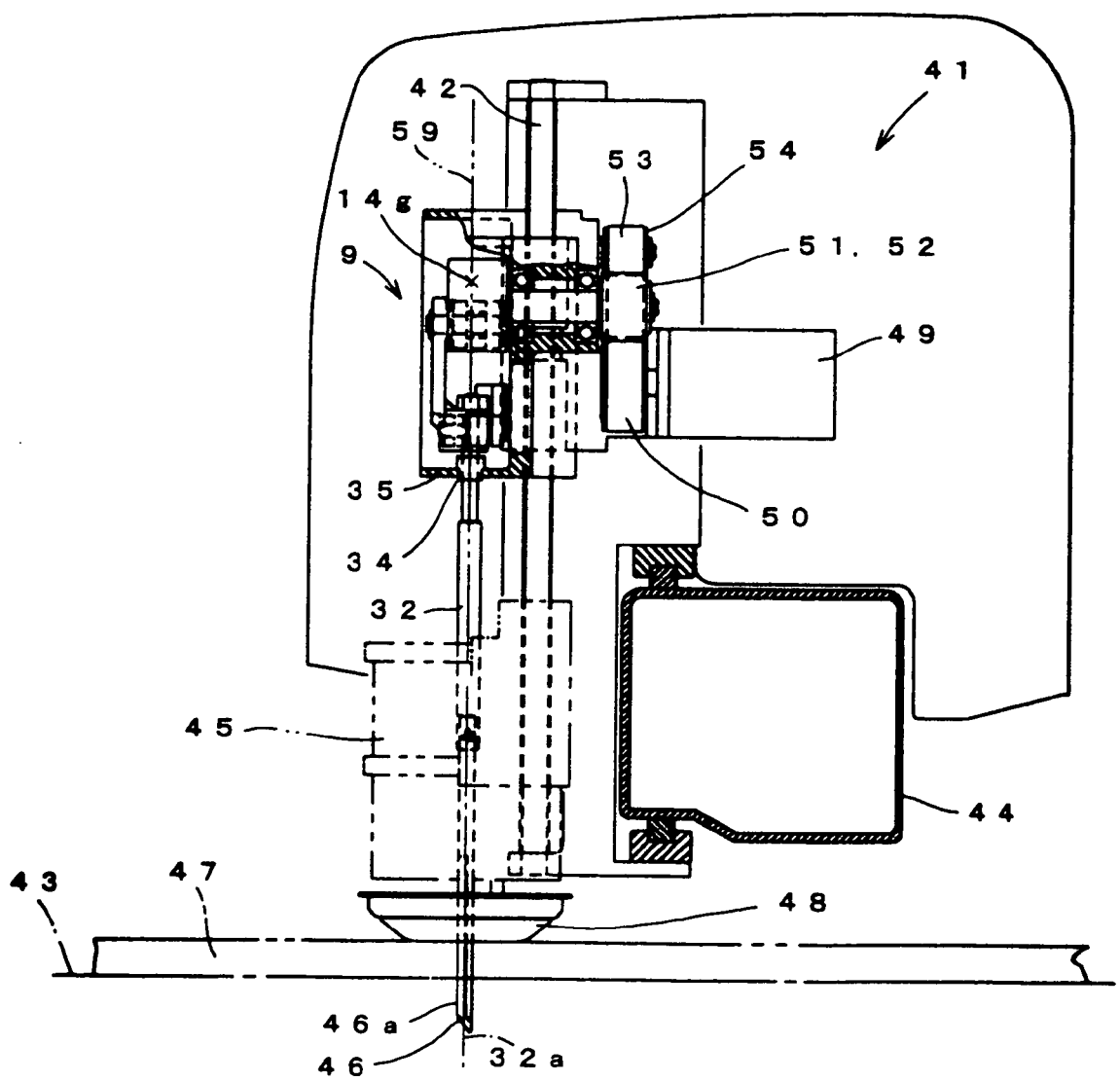
FIG. 3 is a simplified construction of a cutting head 40 incorporated with the vibration damping apparatus for reciprocating drive 9 of FIG. 1.

FIG. 3 shows a schematic construction of a cutting head 40 incorporated with the vibration damping apparatus for reciprocating drive 9 of FIG. 1. The cutting head 40, for use on a cutter similar to the cutting head 5 shown in FIG. 11, is to convert a rotational drive due to a rotation drive section 41 into a reciprocal motion in the axial direction of a vertical-movement guide shaft 42. The axial direction of the vertical-movement guide shaft 42 is parallel with the axis 32a of the knife drive shaft 32. Along a cut-support surface 43 on a cutting table of the cutter, a guide bridge 44 moves in X-axis direction as a left-right direction on the page. The cutting head 40 moves in Y-direction perpendicular to the page along the guide bridge 44. The cutting head 40 is provided with a cut-direction changer 45 capable of changing the direction of a cutting edge of a cutting blade 46 about the axis 32a. The cut-support surface 43 is nearly horizontal while the axis 32a is nearly perpendicular in direction.

The cutting blade 46 is to cut, at its cutting edge 46a, a to-be-cut-sheet 47 by a reciprocal motion in the direction of axis 32a while penetrating through the to-be-cut-sheet 47 supported on the cut-support surface 43. By controlling the movement in X-axis direction by the guide bridge 44, the movement in Y-axis direction by the cutting head 40 and direction of the cutting edge 46a by the cutting-direction changer 45 according to cut data while reciprocally moving the cutting blade 46, the to-be-cut-sheet 47 can be cut into a contour form corresponding to the cutting data. In order to prevent the to-be-cut-sheet 47 from being frictionally raised during ascending of the cutting blade 46 in reciprocal motion from the to-be-cut-sheet 47, the to-be-cut-sheet 47 is held down by a presser 48 in the surface thereof.

The vibration damping apparatus for reciprocating drive 9 is built in the cutting head 40, as one unit accommodated within the casing 35. A motor 49, a rotation-drive source, is used as a drive source for reciprocally moving the cutting blade 46. The motor 49 has a rotation output shaft attached with a driving pulley 50. A first driven pulley 51 and a second driven pulley 52 are respectively attached on the first shaft 11 and the second shaft 12 of the vibration damping apparatus for reciprocating drive 9. In order to drive the first driven pulley 51 and the second driven pulley 52 reverse in direction, a rotatable idle pulley 53 is provided. By a timing belt 54, the rotation drive force of from the driven pulley 50 is conveyed to the first driven pulley 51 and second driven pulley 52.

Figure 4:
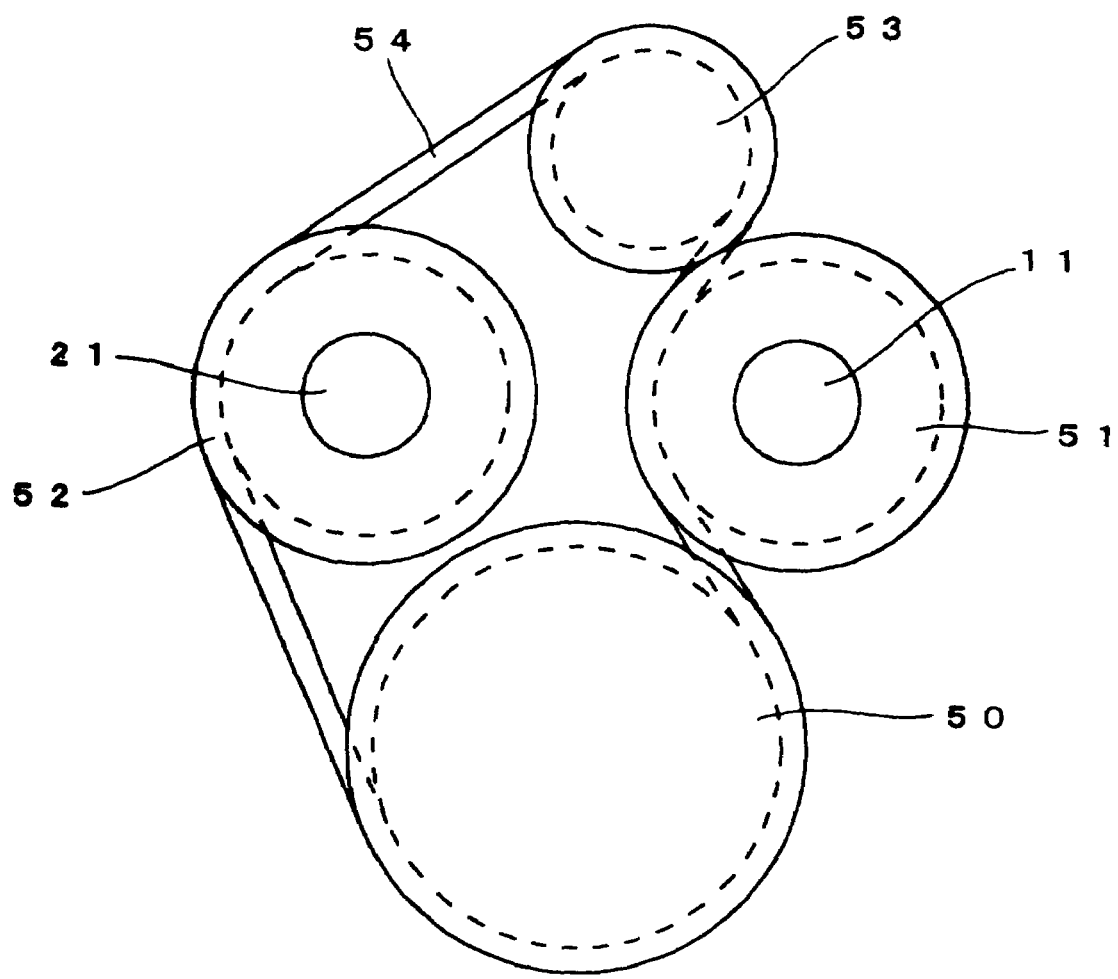
FIG. 4 is a simplified front view showing a structure of rotating the vibration damping apparatus for reciprocating drive 9 of FIG. 1.

FIG. 4 shows a structure of a rotation drive force transmitter. It is assumed that rotated reverse are the first rotary shaft 11 counterclockwise and the second rotary shaft 21 clockwise at equal speed, similarly to FIGS. 1 and 2. Incidentally, FIG. 4 shows a state as viewed from left in FIG. 3, together with FIGS. 1 and 2. The first driven pulley 51 and the second driven pulley 52, attached on the first rotary shaft 11 and the second rotary shaft 21, require to be driven counterclockwise and clockwise, respectively. In case the driving pulley 50 is clockwise in rotational direction similarly to the second driven pulley 52, the timing belt 54 basically is stretched over the driving pulley 50, the second driven pulley 52 and the idle pulley 53. The timing belt 54 employs an endless toothed belt having teeth at both sides of inner and outer peripheries. The first driven pulley 51 is driven at the outer periphery of the timing belt 54. The idle pulley 53 is arranged to increase the length of contact between the first driven pulley 51 and the outer periphery of the timing belt 54.

The timing belt 54 is provided with teeth at equal pitch in the inner and outer peripheries thereof. The first driven pulley 51 and the second driven pulley 52 are provided with teeth in the same number. In case the teeth are provided greater in the number on the driving pulley 50 than the teeth of the first driven pulley 51 and second driven pulley 52, the rotation speed on the first rotary shaft 11 and second rotary shaft 21 can be provided higher than the rotation speed on the motor 49.

Figure 5:
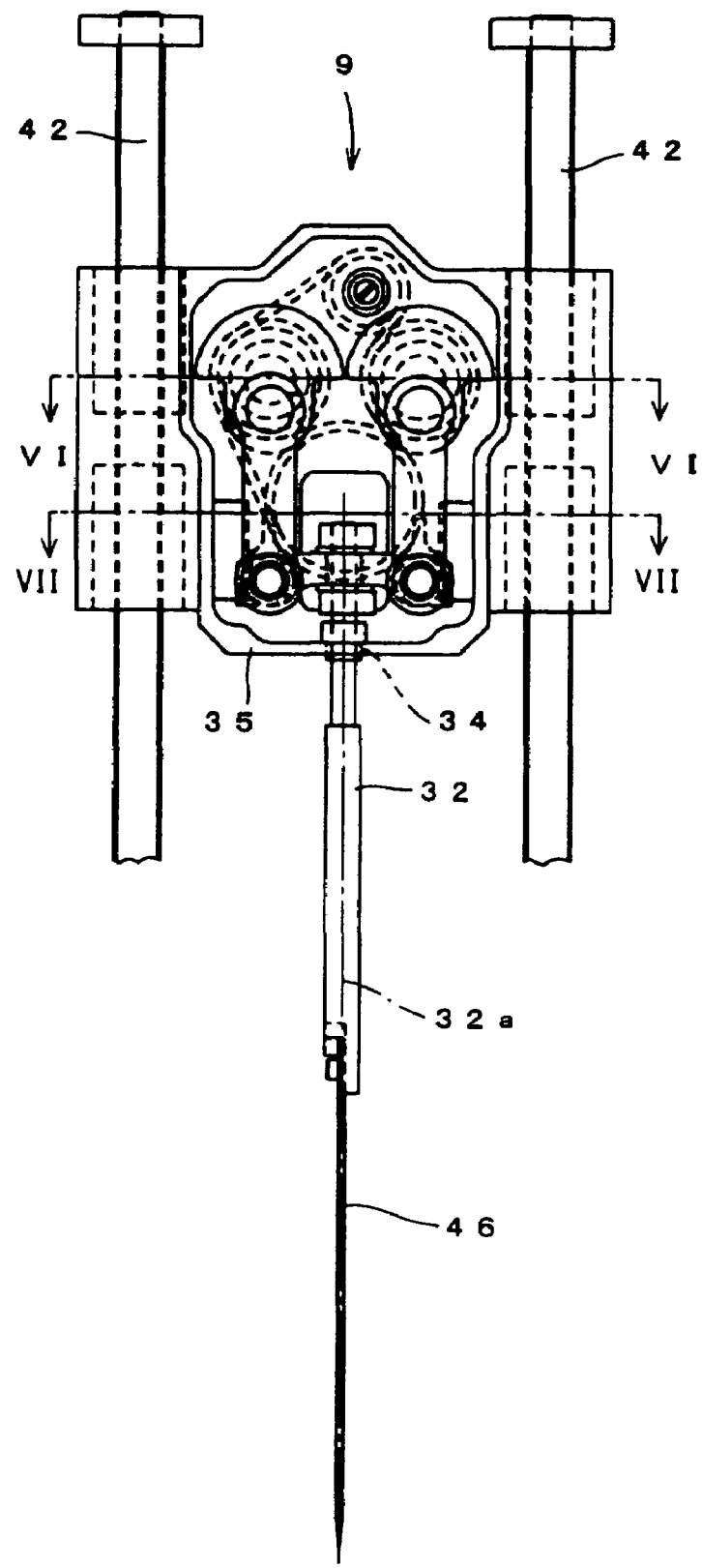
FIG. 5 is a simplified front view showing a state in which a cutting blade 46 is connected to the vibration damping apparatus for reciprocating drive in the cutting head 40.

FIG. 5 shows a vertical movement structure for cutting in a manner of piercing the cutting blade 46 through the to-be-cut-sheet 47 by means of the cutting head 40 of FIG. 3. Vertical-movement guide shafts 42 are provided penetrating through the casing 35 of the vibration damping apparatus for reciprocating drive 9, serving as guides for vertically displacing the cutting blade 46 or the vibration damping apparatus for reciprocating drive 9. The spacing can be narrowed between the first rotary shaft 11 and the second rotary shaft 21. Meanwhile, because the coupling block 31 and knife drive shaft 32 are partly accommodated between the first crank rod 13 and the second crank rod 23, the cutting head 40 can be reduced in size.

Figure 6:
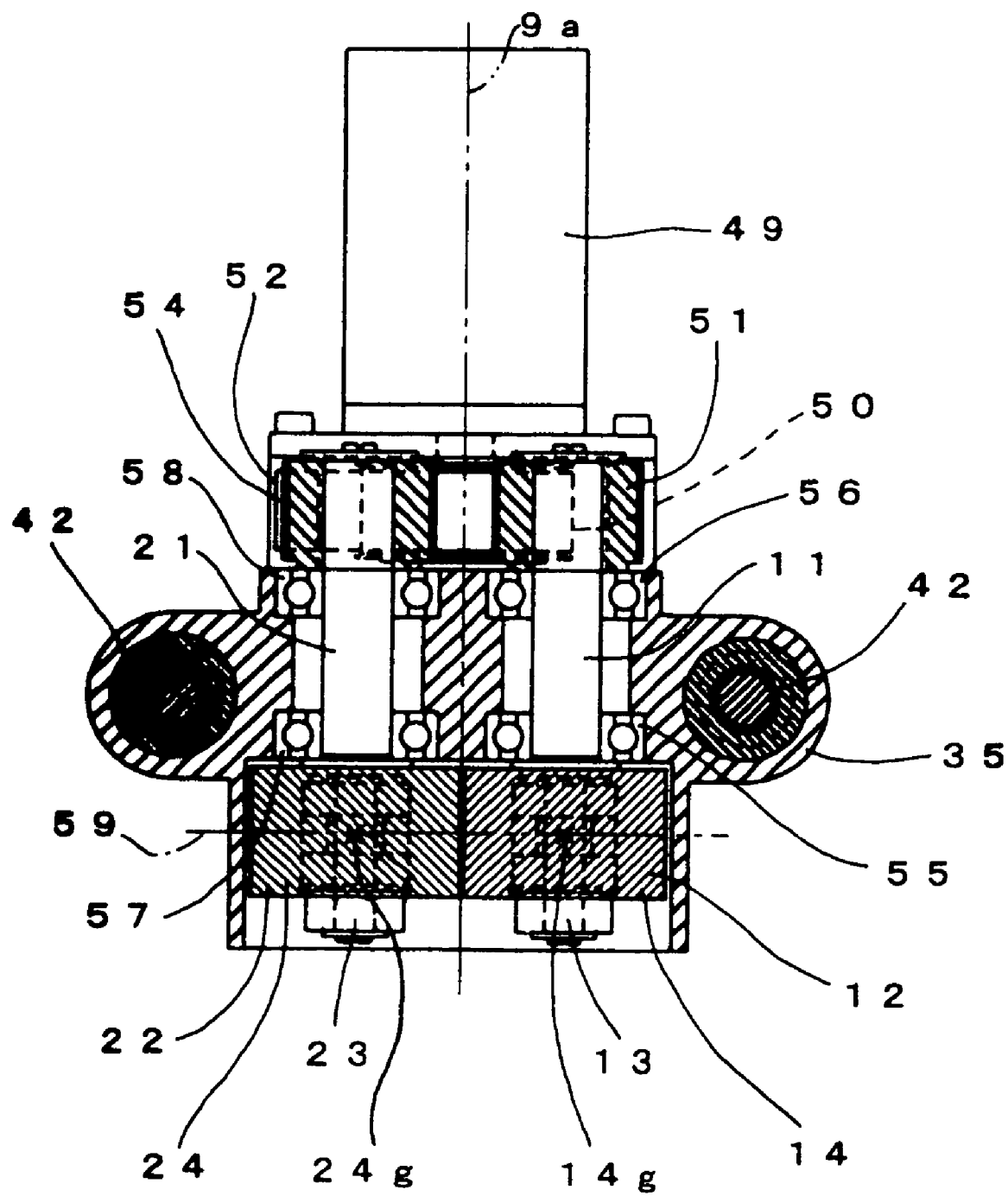
FIG. 6 is a sectional view as viewed at a sectional line VI-VI of FIG. 5.
Figure 7:
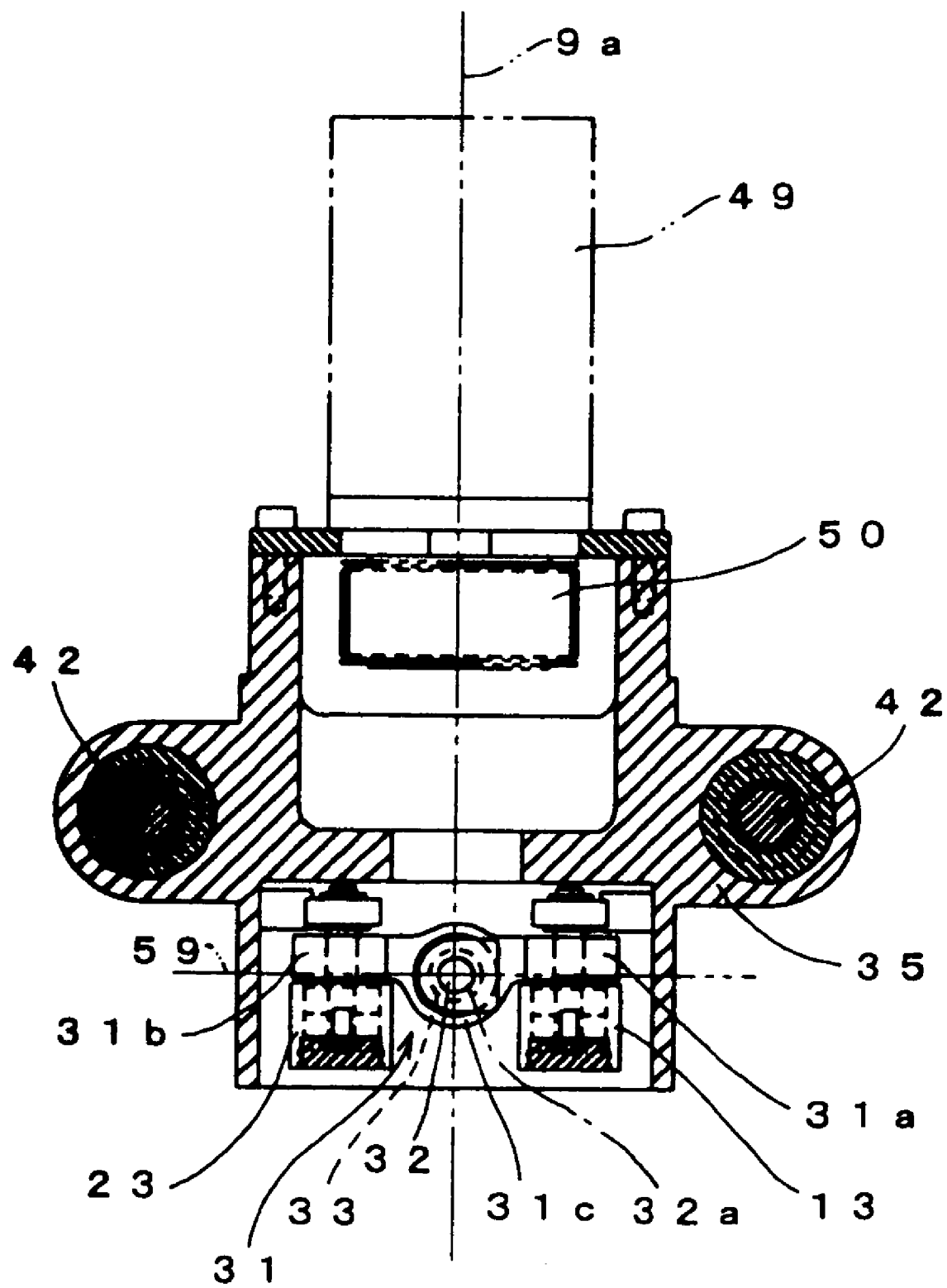
FIG. 7 is a sectional view as viewed at a sectional line VII-VII of FIG. 5.

FIG. 6 and FIG. 7 show structures as viewed at sectional lines VI-VI and VII-VII of FIG. 5, respectively. As shown in FIG. 6, the first rotary shaft 11 and second rotary shaft 21 are arranged, at one end, with a first eccentric cam 12 and second eccentric cam 22 and, at the other end, with a first driven pulley 51 and second driven pulley 52. In the intermediate region, rotary bearings 55, 56, 57, 58 are provided to allow smooth rotation. As shown in FIG. 7, there is included an axis 32a of the knife drive shaft 32. Thus, a virtual plane 59 perpendicular to the virtual plane 9a as a symmetric plane at the intermediate between the first conversion mechanism 10 and the second conversion mechanism 20 passes through the center of gravity 14g, 24g of the first balancer 14 and second balancer 24, as shown in FIG. 6. Namely, the center of gravity position 14g, 24g of the first balancer 14, as a first counter weight and second balancer 24 as a second counter weight, as well as the axis 32a in a drive direction lie on the virtual plane 59 perpendicular to the reference virtual plane 9a. The virtual plane 59 is perpendicular to the axis of the first rotary shaft 11 and second rotary shaft 21. Namely, it is possible to align, on the same plane, the load based on a reciprocal motion of the knife drive shaft 32 and the compensation with the counter weight together. Vibrations can be prevented from occurring due to a positional deviation of the same.

Figure 8:
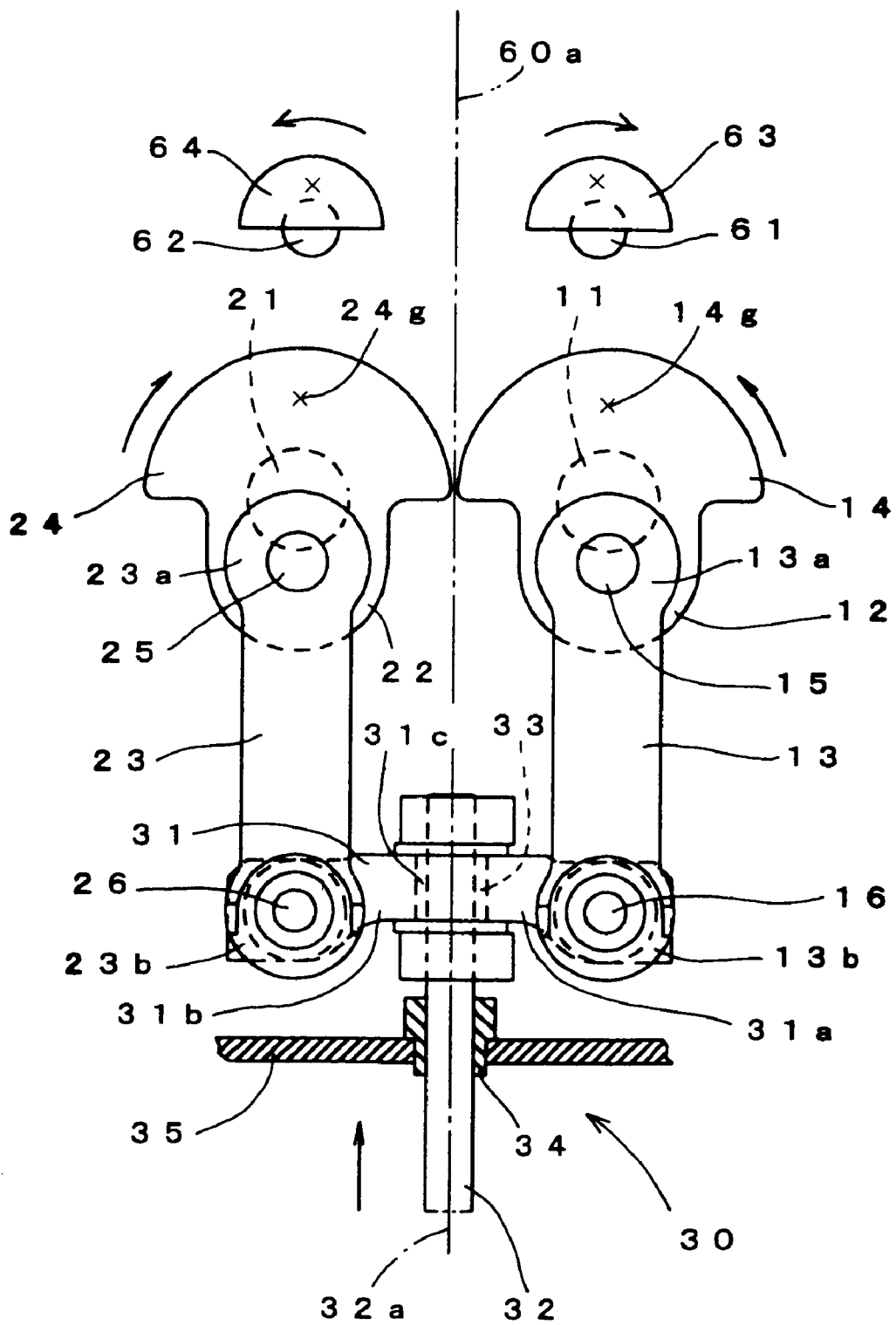
FIG. 8 is a simplified front view showing a schematic structure of a vibration damping apparatus for reciprocating drive 60 according to another embodiment of the invention.

FIG. 8 shows a structure of a major part of the vibration damping apparatus for reciprocating drive 60 as another embodiment of the invention. In this embodiment, those corresponding to the embodiment in FIG. 1 are attached with like references, to omit duplicated explanations. This embodiment includes a third rotary shaft 61, a fourth rotary shaft 62, a third balancer 63 and a fourth balancer 64, which are arranged symmetric with respect to a virtual plane 60a in the center. The third rotary shaft 61 is to rotate reverse to and at a rotational speed twice the first rotation shaft 11. The fourth rotary shaft 62 is to rotate reverse to and at a rotational speed twice the second rotation shaft 21. Because the first rotary shaft 11 and the second rotary shaft 21 rotate reverse in direction, the third rotary shaft 61 rotates in the same direction as the second rotary shaft 21 while the fourth rotary shaft 62 rotates in the same direction as the second rotary shaft 21.

The third rotary shaft 61 and the fourth rotary shaft 62 are respectively provided with the third balancer 63 and the fourth balancer 64. The third balancer 63 and the fourth balancer 64 are eccentric in their center-of-gravity positions, to reduce the secondary vibration half in period relative to the period of the basic reciprocal motion. Namely, the third rotary shaft 61 and the fourth rotary shaft 62 are arranged symmetric with respect to the reference virtual plane 60a similarly to the symmetric relationship of between the first conversion mechanism 10 and the second conversion mechanism 20, to provide the third balancer 63 and the fourth balancer 64 that are lighter in weight than and eccentric in center-of-gravity position relative to the first balancer 14 and second balancer 24. Because the third rotary shaft 61 and the fourth rotary shaft 62 are rotated at a speed twice the first rotary shaft 11 and second rotary shaft 21 and reverse to each other, the secondary vibration can be damped that is difficult to damp with the first balancer 14 and second balancer 24. The third balancer 14 and fourth balancer 24, because lighter in weight than the first balancer 14 and second balancer 24, can be reduced in size. Even in case the third rotary shaft 61 and fourth rotary shaft 62 are provided, size increase can be avoided for the vibration damping apparatus for reciprocating drive 60.

Figure 9:
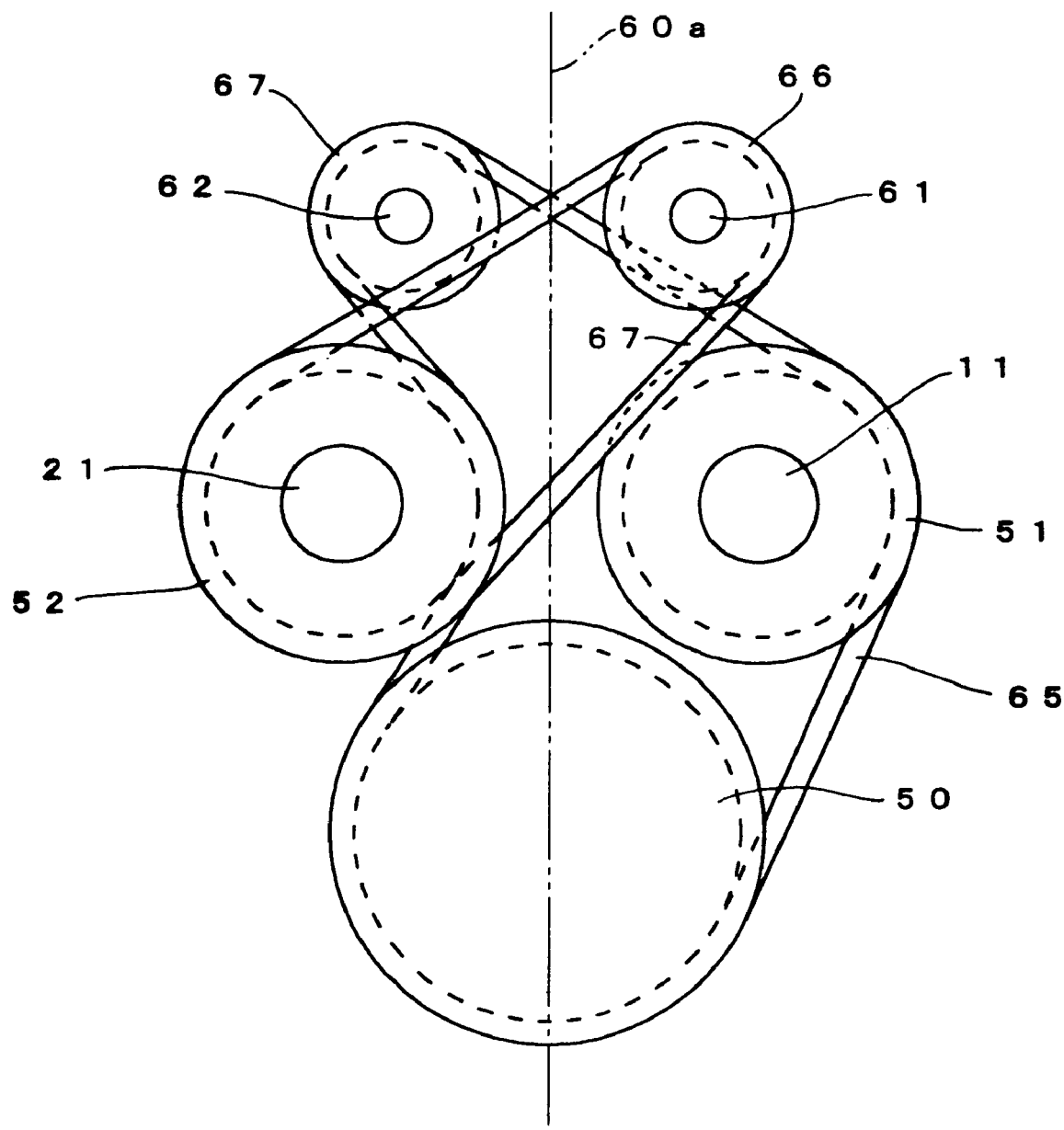
FIG. 9 is a simplified front view showing a structure of rotating the vibration damping apparatus for reciprocating drive 60 of FIG. 8.

FIG. 9 shows a structure for delivering a rotational drive force by means of the vibration damping apparatus for reciprocating drive 60. In this embodiment, the driving pulley 50 is driven for rotation counterclockwise. The third rotary shaft 61 and the fourth rotary shaft 62 in FIG. 8 are respectively attached with a third driven pulley 66 and a fourth driven pulley 67, thus being allowed for rotation. A timing belt 65 is provided with teeth at equal pitch in the inner and outer peripheries thereof, similarly to the timing belt 54 shown in FIG. 4. By placing the fourth driven pulley 67 on a side close to the second driven pulley 52, the timing belt 65 is stretched over the driving pulley 50, the first driven pulley 51 and the fourth driven pulley 67. With the fourth driven pulley 67, a path is established to put the outer periphery of timing belt 65 in mesh with the second driven pulley 52. Namely, the fourth driven pulley 67 has a function corresponding to the idle pulley 53 in FIG. 4. The third driven pulley 66 having the third rotary shaft 61 is provided in a position symmetric with the fourth rotary shaft 62 of the fourth driven pulley 67 with respect to the virtual plane 60a. A timing belt 67 is stretched between the third driven pulley 66 and the second driven pulley 52. In at least the inner periphery of the timing belt 67, teeth are provided equal in pitch to the timing belt 65.

The third driven pulley 66 and the fourth driven pulley 67 are provided with teeth half in the number of the first driven pulley 51 and the second driven pulley 52, respectively. When the driving pulley 50 rotatively drives the first driven pulley 51 and second driven pulley 52 through the timing belt 65, the fourth driven pulley 67 is rotatively driven in the same direction as and at a twice rotational speed of the first driven pulley 51. The second driven pulley 52 is rotatively driven at an equal speed to and in reverse direction to the first driven pulley 51, to drive the third driven pulley 66 in the same direction at twice speed through the timing belt 67.

Figure 10:
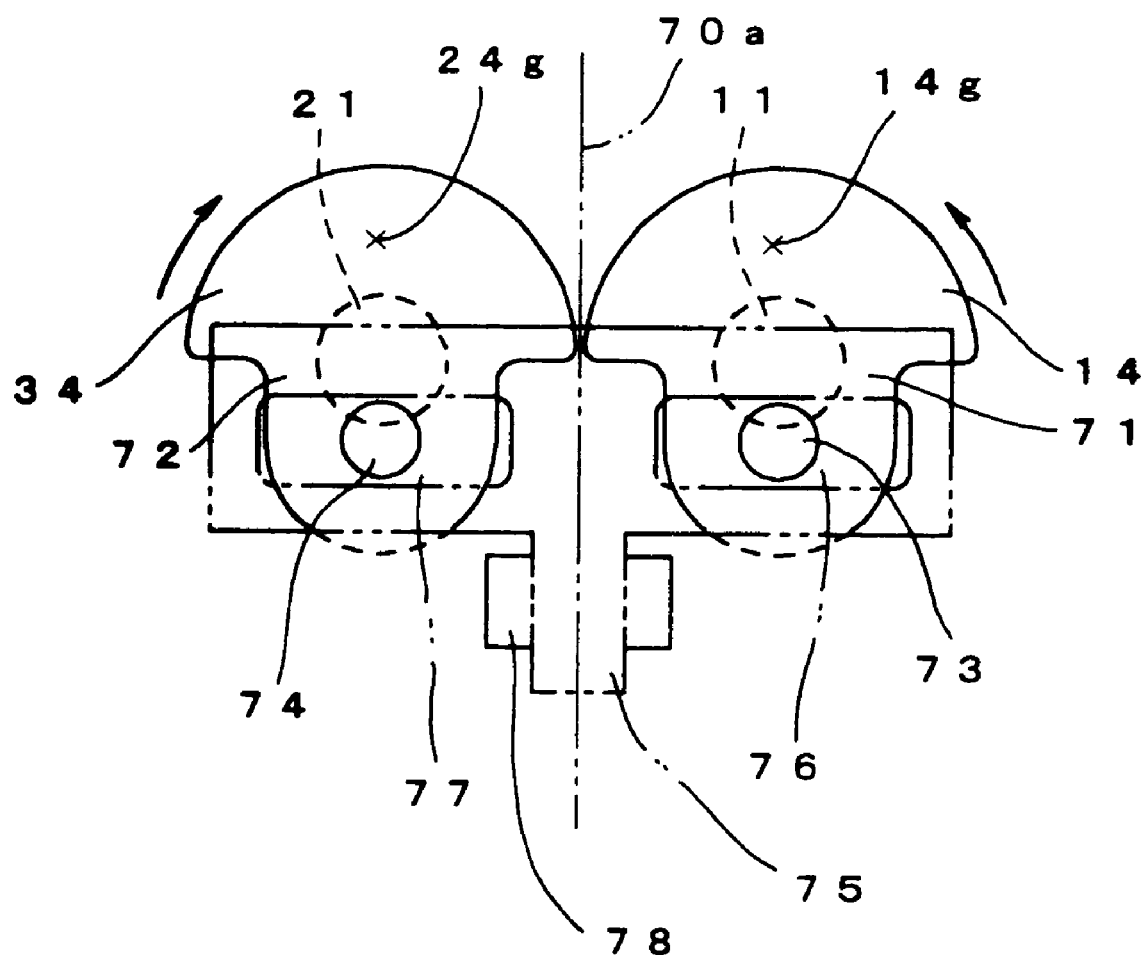
FIG. 10 is a simplified front view showing a schematic structure of a vibration damping apparatus for reciprocating drive 70 according to further another embodiment of the invention.

FIG. 10 shows a schematic structure of a vibration damping apparatus for reciprocating drive 70 in still another embodiment of the invention. In this embodiment, those corresponding to the embodiment in FIG. 1 are attached with like references, to omit duplicated explanations. The vibration damping apparatus for reciprocating drive 70 in this embodiment includes a first conversion cam 71 and a second conversion cam 72 that are arranged symmetric with respect to a virtual plane 70a. The first conversion cam 71 and the second conversion cam 72 are respectively attached on one ends of the first rotary shaft 11 and the second rotary shaft 21. In the first conversion cam 71 and the second conversion cam 72, a first follower 73 and a second follower 74 are respectively provided at positions eccentric from the first rotary shaft 11 and the second rotary shaft 21, respectively, engaged in a first groove cam 76 and a second groove cam 77 of a coupling cam member 75. The coupling cam member 75 is attached with a knife drive shaft 32 at the center thereof. By a guide mechanism 78, guiding is effected for the reciprocal motion in the direction of axis 32a.

In also this embodiment, because conversion mechanism of from rotational motion into reciprocal motion is effected symmetric with respect to the virtual plane 70a by the first conversion cam 71, second conversion cam 72 and coupling cam member 75, it is possible to take a force balance in a direction perpendicular to the virtual plane 70a. Meanwhile, with the first conversion cam 71 and second conversion cam 72, a force balance can be taken in the direction of axis 32a of reciprocal motion by arranging the center of gravities 14g, 24g of the first balancer 14 and second balancer 24 in positions 180-degree opposite to the first follower 73 and second follower 74 and sandwiching the first rotary shaft 11 and second rotary shaft 21. Because of the capability to take a force balance in between the direction of axis 32a and the direction perpendicular thereto, vibration can be suppressed from occurring.

The vibration damping apparatus for reciprocating drive 60, 70 explained above is usable on a cutting head 40 of a cutter shown in FIG. 3, similarly to the vibration damping apparatus for reciprocating drive 9 of the FIG. 1 embodiment. Even in case the cutting blade 46 is reciprocated at high speed, e.g. nearly 6000 cycles per minute, the vibration occurred can be damped so that the cutting head 40 can be made compact. Meanwhile, vibration damping apparatus for reciprocating drive 9, 60, 70 is to be used in reciprocally driving a needle of sewing machine besides on the cutting head 40 of a cutter.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

As described above, according to the present invention, a first conversion mechanism and a second conversion mechanism in a pair are arranged symmetric with respect to a reference virtual plane in order to damp the vibration occurring upon conversion of rotary motion into reciprocal motion, to rotate a first rotary shaft of the first conversion mechanism and a second rotary shaft of the second conversion mechanism reverse to each other, thus making it possible to offset and damp the vibration caused by rotation. Each of the rotary shafts is provided with a counter weight for converting, at a drive position provided eccentric, a rotary motion into a reciprocal motion in a drive direction parallel with a virtual plane and taking a balance with an offset load occurring upon converting the motion by having a center of gravity on a side symmetric with the drive position. The vibration occurring upon converting the motion can be reduced and damped by the counter weight. Because the conversion mechanisms in a pair, at a combining mechanism, extracts and combines together reciprocal motions in a drive direction respectively converted from rotary motions, it is possible to cancel and damp the other motion components than those in the drive direction. Because the conversion mechanisms are provided symmetric in a manner being in a pair so that the conversion mechanisms can extract and combines together reciprocal motions converted from rotary motions, the vibration due to reciprocal motion can be damped with balancing by a simple structure. Because the rotary shafts are satisfactorily two, size reduction can be easily done.

Meanwhile, according to the invention, a third rotary shaft and a fourth rotary shaft are arranged symmetric with respect to a reference virtual plane similarly to the symmetric relationship of between the first conversion mechanism and the second conversion mechanism and provided respectively with third and fourth counter weights lighter in weight than the first and second counter weights and eccentric in center-of-gravity position. Because the third and fourth rotary shafts are rotated reverse to each other at a speed twice the first and second rotary shafts, it is possible to damp the secondary vibration that damping is difficult by the first and second counter weights. The third and fourth counter weights, because lighter in weight than the first and second counter weights, can be made smaller in size. Size increase can be avoided even where third and fourth rotary shafts are provided.

Meanwhile, according to the invention, a reciprocal motion combined by the combining mechanism is on a symmetric plane concerning the first and second conversion mechanisms. Therefore, by utilizing a space caused between the first and second conversion mechanisms, a subject of reciprocal motion can be arranged. Size reduction is possible by reducing the length required in the drive direction.

Meanwhile, according to the invention, the first and second conversion mechanisms arranged symmetric with respect to the reference virtual plane are crank mechanisms having crank rods each having one end pivotably and displaceably coupled to the eccentric drive position. Since the crank rods are to move symmetrically with respect to the reference virtual plane, the motion components different from the drive direction become in a reverse direction with each other and thereby cancel each other. The combining mechanism is pivotably and displaceably coupled to the other ends of the crank rods of the first and second conversion mechanisms by means of a coupling member. Because reciprocal motion is guided into the drive direction by a guide mechanism, reciprocal motions in the drive direction can be easily extracted and combined together.

Meanwhile, according to the invention, the center-of-gravity position of the first and second counter weights and the drive direction are on the same virtual plane perpendicular to the reference virtual plane. Because this virtual plane is perpendicular to the axis of the rotary shaft, the load due to reciprocal motion and the compensation with the counter weight can be aligned to the same position in respect of axially frontward and rearward directions. Vibration is suppressed from occurring due to the positional deviation.

Meanwhile, according to the invention, the rotation drive force derived from a rotation drive source to the driving pulley is conveyed to the first and second driven pulleys through a belt stretched on first and second driven pulleys provided on the first and second rotary shafts and an idle pulley, which makes it possible to rotatively drive the first and second rotary shafts respectively. Because of using the idle pulley, the belt can be stretched along a path the first driven pulley and the second driven pulley are respectively in contact with the both surfaces of the belt, thus making it possible to easily rotate the first driven pulley and the second driven pulley reverse in direction. The belt, if using a toothed timing belt, can be driven at high speed without slippage, making it possible to positively rotate the first and second rotational shafts reverse in direction and damp the vibration.

Furthermore, according to the invention, the cutting blade is reciprocally driven by the provision of a vibration damping apparatus for reciprocating drive for the cutting head according to any of the above ones. Accordingly, even when the cutting blade is reciprocally driven at high speed, vibration is prevented from occurring thus making it possible to reduce the cutting head size.

The invention claimed is:

1. A vibration damping apparatus for reciprocating drive, for damping vibration occurring upon conversion of rotary motion, from a rotation outputting shaft of a rotation drive source, to reciprocal motion in a reciprocating drive direction, comprising:

a first conversion mechanism, the first conversion mechanism including a first rotary shaft, a first counterweight contacting the first rotary shaft, and a first drive shaft contacting the first counterweight the first drive shaft being connected to the first counter weight at a first drive position, the first drive position being eccentric with respect to the first rotary shaft, to convert a rotary motion of the first rotary shaft to reciprocal motion, via the first drive shaft at the first drive position, in the direction of the reciprocating drive direction, wherein the first counter weight has a center of gravity in a position on a side symmetric with the first drive position with respect to the first rotary shaft, for balancing an offset load occurring upon motion conversion;

a second conversion mechanism, the second conversion mechanism including a second rotary shaft, a second counterweight contacting to the second rotary shaft, and a second drive shaft contacting the second counterweight, the second drive shaft being connected to the second counter weight at a second drive position, the second drive position being eccentric with respect to the second rotary shaft, to convert a rotary motion of the second rotary shaft to reciprocal motion, via the second drive shaft at the second drive position, in the direction of the reciprocating drive direction, the second conversion mechanism being provided in pair with the first conversion mechanism so as not to be in direct contact with the first conversion mechanism and arranged symmetric with the first conversion mechanism with respect to a reference virtual plane parallel with the reciprocating drive direction and the second rotary shaft rotating at equal speed reverse to and parallel with the first rotary shaft so that a reciprocal motion in the reciprocating drive direction is included in the second drive position synchronously with a reciprocal motion converted by the first conversion mechanism, wherein the second counter weight provided in pair with the first counter weight has a center of gravity in a position on a side symmetric with the second drive position with respect to the second rotary shaft, for balancing an offset load occurring upon motion conversion; and a combining mechanism to extract and combine reciprocal motions in the reciprocating drive direction which is converted from rotary motions by the first conversion mechanism and the second conversion mechanism, respectively, rotary driving force from the rotation drive source being transmitted via a belt to the first conversion mechanism and the second conversion mechanism.

2. The vibration damping apparatus for reciprocating drive of claim 1, further comprising:

a third counter weight provided on a third rotary shaft parallel with the first rotary shaft and rotating reverse at a rotational speed twice a rotational speed of the first rotary shaft, the third counter weight being lighter in weight than the first counter weight and eccentric in center-of-gravity position with respect to the third rotary shaft; and a fourth counter weight provided in pair with the third counter weight and arranged symmetric with the third counter weight with respect to the reference virtual plane, the fourth counter weight being provided on a fourth rotary shaft parallel with the second rotary shaft and rotating reverse at a rotational speed twice a rotational speed of the second rotational shaft, the fourth counter weight being lighter in weight than the second counter weight and eccentric in center-of-gravity position with respect to the fourth rotary shaft.

3. The vibration damping apparatus for reciprocating drive of claim 1, wherein the combining mechanism carries out the combining so that the drive direction is on the reference virtual plane.

4. The vibration damping apparatus for reciprocating drive of claim 1, wherein the first conversion mechanism and the second conversion mechanism are crank mechanisms each provided with a crank rod, respectively, the crank rod for the first conversion mechanism having one end pivotably and displaceably coupled to the first drive position via the first drive shaft and the crank rod for the second conversion mechanism having one end pivotably and displaceably coupled to the second drive position via the second drive shaft;

the combining mechanism including coupling members pivotably and displaceably coupled to other ends of crank rods of the first conversion mechanism and second conversion mechanism, respectively, and a guide mechanism for guiding a reciprocal motion combined by the coupling member, in the drive direction.

5. The vibration damping apparatus for reciprocating drive of claim 4, wherein center-of-gravity positions of the first and second counter weights and the drive direction are one a virtual place perpendicular to the reference virtual plane.

6. A cutting head comprising:

the vibration damping apparatus for reciprocating drive according to claim 1, the cutting head reciprocally driving a cutting blade on a reciprocal motion combined by the combining mechanism.

7. The vibration damping apparatus for reciprocating drive of claim 2, wherein the combining mechanism carries out the combining so that the drive direction is on the reference virtual plane.

8. The vibration damping apparatus for reciprocating drive of claim 2, wherein the first conversion mechanism and the second conversion mechanism are crank mechanisms each provided with a crank rod, respectively, the crank rod for the first conversion mechanism having one end pivotably and displaceably coupled to the first drive position via the first drive shaft and the crank rod for the second conversion mechanism having one end pivotably and displaceably coupled to the second drive position via the second drive shaft;

the combining mechanism including coupling members pivotably and displaceably coupled to other ends of crank rods of the first conversion mechanism and second conversion mechanism, respectively, and a guide mechanism for guiding a reciprocal motion combined by the coupling member, in the drive direction.

9. The vibration damping apparatus for reciprocating drive of claim 3, wherein the first conversion mechanism and the second conversion mechanism are crank mechanisms each provided with a crank rod, respectively, the crank rod for the first conversion mechanism having one end pivotably and displaceably coupled to the first drive position via the first drive shaft and the crank rod for the second conversion mechanism having one end pivotably and displaceably coupled to the second drive position via the second drive shaft;

the combining mechanism including coupling members pivotably and displaceably coupled to other ends of crank roads of the first conversion mechanism and second conversion mechanism, respectively, and a guide mechanism for guiding a reciprocal motion combined by the coupling member, in the drive direction.

10. A cutting head comprising:

the vibration damping apparatus for reciprocating drive according to claim 2, the cutting head reciprocally driving a cutting blade on a reciprocal motion combined by the combining mechanism.

11. A cutting head comprising:

the vibration damping apparatus for reciprocating drive according to claim 3, the cutting head reciprocally driving a cutting blade on a reciprocal motion combined by the combining mechanism.

12. A cutting head comprising:

the vibration damping apparatus for reciprocating drive according to claim 4, the cutting head reciprocally driving a cutting blade on a reciprocal motion combined by the combining mechanism.

13. A cutting head comprising:

the vibration damping apparatus for reciprocating drive according to claim 5, the cutting head reciprocally driving a cutting blade on a reciprocal motion combined by the combining mechanism.

14. A vibration damping apparatus for reciprocating drive, for damping vibration occurring upon conversion of rotary motion into reciprocal motion, comprising:

a first conversion mechanism to convert a rotary motion of a first rotary shaft so that a reciprocal motion in a drive direction perpendicular to the first rotary shaft is included in a drive position provided eccentrically from the first rotary shaft, the first conversion mechanism including a first counter weight having a center of gravity in a position on a side symmetric with the drive position with respect to the first rotary shaft, for balancing an offset load occurring upon motion conversion;

a second conversion mechanism, provided in pair with the first conversion mechanism and arranged symmetric with the first conversion mechanism with respect to a reference virtual plane parallel with the drive direction, to convert a rotary motion of a secondary rotary shaft which rotates at equal speed reverse to and is parallel with the first rotating shaft so that a reciprocal motion in the drive direction is included in a drive position provided eccentrically from the second rotary shaft, synchronously with a reciprocal motion converted by the first conversion mechanism, the second conversion mechanism including a second counter weight provided in pair with the first counter weight and having a center of gravity in a position on a side symmetric with the drive position with respect to the second rotary shaft for balancing an offset load occurring upon motion conversion;

a combining mechanism to extract and combine together reciprocal motions in the drive direction converted from rotary motions by the first conversion mechanism and the second conversion mechanism, respectively;

a rotation drive source to drive a rotation output from a driving pulley;

a first driven pulley provided on the first rotary shaft;

a second driven pulley provided on the second rotary shaft so as to be paired with the first driven pulley;

an idle pulley provided so as to freely rotate; and a single looped belt stretched over the driving pulley the first driven pulley, the second driven pulley and the idle pulley, to convey a rotation drive force from the driving pulley to the first driven pulley and the second drive pulley, so that rotational directions of the rotation drive force become different between the first driven pulley and the second driven pulley.

15. A cutting head comprising:

the vibration damping apparatus for reciprocating drive according to claim 14, the cutting head reciprocally driving a cutting blade on a reciprocal motion combined by the combining mechanism.

\* \* \* \* \*